US012190687B1

(12) United States Patent
Kallis

(10) Patent No.: US 12,190,687 B1
(45) Date of Patent: Jan. 7, 2025

(54) LOTTERY TICKET DISPENSING SYSTEM INCLUDING LOTTERY TICKET VENDING MACHINE AND A LOTTERY TICKET VENDING MACHINE SIDE CAR

(71) Applicant: IGT Global Solutions Corporation, Providence, RI (US)

(72) Inventor: Apostolos D. Kallis, Barrington, RI (US)

(73) Assignee: IGT Global Solutions Corporation, Providence, RI (US)

( * ) Notice: Subject to any disclaimer, the term of this patent is extended or adjusted under 35 U.S.C. 154(b) by 0 days.

(21) Appl. No.: 18/462,669

(22) Filed: Sep. 7, 2023

(51) Int. Cl.
*G07F 17/42* (2006.01)
*G07F 11/68* (2006.01)

(52) U.S. Cl.
CPC .............. *G07F 17/42* (2013.01); *G07F 11/68* (2013.01)

(58) Field of Classification Search
CPC ........................................................ G07F 11/68
USPC .......................................................... 235/375
See application file for complete search history.

(56) References Cited

U.S. PATENT DOCUMENTS 3,855,457 A 12/1974 Amundson et al.
4,603,884 A * 8/1986 Burton .................. A63F 3/0625 434/165
5,156,397 A * 10/1992 Valenza, Jr. ............ A63F 3/064 463/16
5,222,624 A 6/1993 Burr
5,408,417 A 4/1995 Wilder
5,676,231 A 10/1997 Legras et al.
5,836,498 A 11/1998 Turek
6,220,954 B1 4/2001 Nguyen et al.
6,227,970 B1 * 5/2001 Shimizu .................. G07F 17/32 463/16
6,350,193 B1 2/2002 Paulsen
6,533,659 B2 3/2003 Seymour et al.
6,609,644 B1 8/2003 Menna
6,712,253 B2 3/2004 Hargrave et al.
6,714,838 B2 3/2004 Scrymgeour et al.
6,726,077 B2 4/2004 Roberts et al.
7,032,774 B2 4/2006 Boehm et al.
7,032,793 B2 4/2006 Roberts et al.
7,383,099 B2 6/2008 Pollard et al.
7,562,798 B2 7/2009 Bartolone et al.
7,665,394 B2 2/2010 Roberts et al.
7,833,102 B2 11/2010 Beadell et al.
7,850,257 B2 12/2010 Roberts et al.
8,127,973 B2 3/2012 Mirkovic et al.
8,192,268 B1 6/2012 Karpe
8,210,921 B1 7/2012 Karpe
8,505,708 B2 8/2013 Frady et al.
8,534,524 B2 9/2013 Businger et al.
8,550,294 B2 10/2013 Martin
9,361,760 B1 * 6/2016 Chen ................... G07F 17/3269
9,613,337 B1 4/2017 Garrison
9,685,026 B1 6/2017 Garrison
10,121,318 B2 11/2018 Lemay et al.
(Continued)

*Primary Examiner* — Allyson N Trail
(74) *Attorney, Agent, or Firm* — Neal, Gerber & Eisenberg LLP

(57) ABSTRACT

A lottery ticket dispensing system including a lottery ticket vending machine and a lottery ticket vending machine side car including a housing, a physical connection assembly, an electrical connection and communication assembly, and at least one of a paper bet slip receiver assembly, a currency receiver assembly, and a coin receiver assembly.

20 Claims, 9 Drawing Sheets

(56) References Cited

U.S. PATENT DOCUMENTS

| | | | | |
|---|---|---|---|---|
| 10,438,452 | B2 | 10/2019 | Ferron et al. | |
| 10,559,165 | B1 | 2/2020 | Kelley et al. | |
| 11,010,987 | B2 | 5/2021 | Bucci | |
| 2002/0155871 | A1* | 10/2002 | Celona | G07F 17/3293 463/13 |
| 2003/0120381 | A1 | 6/2003 | Perin et al. | |
| 2004/0000572 | A1 | 1/2004 | Engelhardt, Jr. et al. | |
| 2005/0178810 | A1 | 8/2005 | Woods et al. | |
| 2005/0187002 | A1* | 8/2005 | Falciglia | G07F 17/3265 463/13 |
| 2007/0017978 | A1 | 1/2007 | Ho | |
| 2007/0021191 | A1* | 1/2007 | White | G07F 17/3248 463/25 |
| 2007/0088459 | A1 | 4/2007 | Pollard et al. | |
| 2008/0287187 | A1* | 11/2008 | Seelig | G07F 17/3248 463/25 |
| 2009/0247287 | A1* | 10/2009 | Voutes | G07F 17/329 463/25 |
| 2010/0308071 | A1 | 12/2010 | Businger | |
| 2014/0008407 | A1 | 1/2014 | Bucci et al. | |
| 2016/0232741 | A1 | 8/2016 | Assis et al. | |
| 2022/0108562 | A1 | 4/2022 | Claude et al. | |
| 2022/0114842 | A1 | 4/2022 | Mejenborg et al. | |
| 2022/0114860 | A1 | 4/2022 | Mejenborg et al. | |
| 2024/0021054 | A1 | 1/2024 | Topalian et al. | |

* cited by examiner

LOTTERY TICKET DISPENSING SYSTEM INCLUDING LOTTERY TICKET VENDING MACHINE AND A LOTTERY TICKET VENDING MACHINE SIDE CAR

BACKGROUND

The present disclosure relates to a lottery ticket dispensing system including a lottery ticket vending machine and a lottery ticket vending machine side car.

Lottery tickets such as instant lottery tickets may be printed on a strip that may be rolled or fan-folded and provided as a pack of lottery tickets. Lottery tickets in such strips may be separated along perforations formed between adjacent tickets in the strips. Lottery tickets may vary in width and length. Lottery tickets may be sold from such packs using lottery ticket vending machines.

BRIEF SUMMARY

In various embodiments, the present disclosure relates to a lottery ticket dispensing system including a lottery ticket vending machine and a side car. The lottery ticket vending machine includes a housing, a ticket drawer column in the housing, the ticket drawer column comprising a plurality of ticket drawers, each of the ticket drawers configured to hold a strip of lottery tickets, a ticket burster in the housing, the ticket burster defining a ticket inlet and a ticket outlet, the ticket burster movable to a plurality of different ticket receipt positions, each different ticket receipt position associated with and in alignment with a different one of the ticket drawers, and a controller configured to control operation of the ticket burster. The side car includes a housing, a physical connection assembly configured to connect the side car to the housing of the lottery ticket vending machine, an electrical connection and communication assembly configured to send data to the controller, and at least one of a paper bet slip receiver assembly, a currency receiver assembly, and a coin receiver assembly.

In various other embodiments, the present disclosure relates to a lottery ticket dispensing system including a lottery ticket vending machine and a side car. The lottery ticket vending machine includes a housing, a ticket drawer column in the housing, the ticket drawer column comprising a plurality of ticket drawers, each of the ticket drawers configured to hold a strip of lottery tickets, a ticket burster in the housing, the ticket burster defining a ticket inlet and a ticket outlet, the ticket burster movable to a plurality of different ticket receipt positions, each different ticket receipt position associated with and in alignment with a different one of the ticket drawers, and a controller configured to control operation of the ticket burster. The side car includes a housing, a physical connection assembly configured to connect the side car to the housing of the lottery ticket vending machine, and an electrical connection and communication assembly configured to send data to the controller.

In various other embodiments, the present disclosure relates to a side car for a lottery ticket dispensing system including a lottery ticket vending machine having a housing, a plurality of ticket drawers in the housing, each of the ticket drawers configured to hold a strip of lottery tickets, a ticket burster in the housing, and a controller configured to control operation of the ticket burster. The side car includes a housing, a physical connection assembly configured to connect the side car to the housing of the lottery ticket vending machine, an electrical connection and communication assembly configured to send data to the controller, and at least one of a paper bet slip receiver assembly, a currency receiver assembly, and a coin receiver assembly.

Additional features are described in, and will be apparent from, the following Detailed Description and the figures.

DETAILED DESCRIPTION

Figure 1:
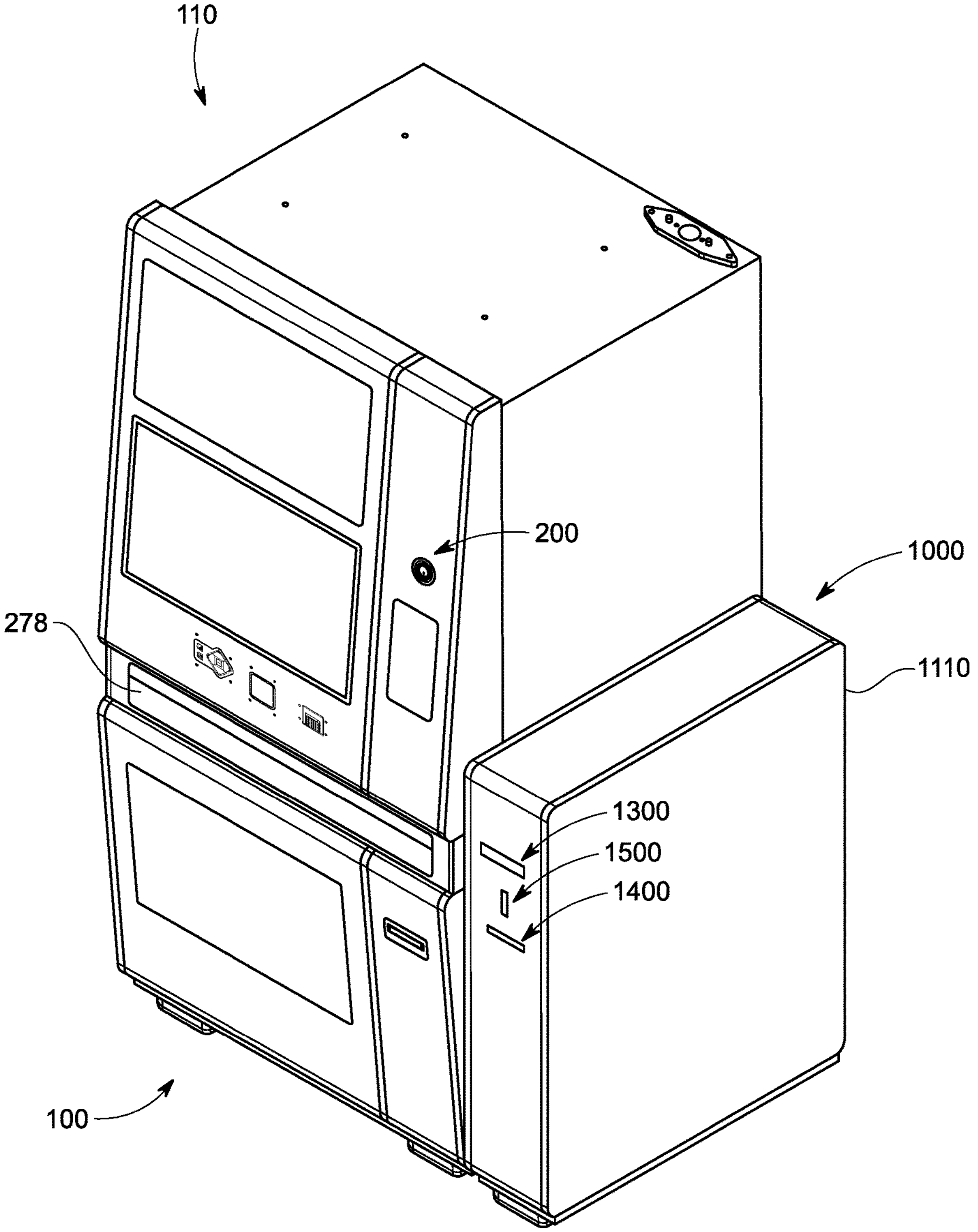
FIG. 1 is a front perspective view of a lottery ticket dispensing system including a lottery ticket vending machine and a lottery ticket vending machine side car of one example embodiment of the present disclosure, wherein the lottery ticket vending machine is shown with a front door thereof in a closed position.

In various embodiments, the present disclosure relates to a lottery ticket dispensing system including a lottery ticket vending machine and a lottery ticket vending machine side car for the lottery ticket vending machine. The lottery ticket vending machine is configured to store and dispense lottery tickets from its ticket drawers. The lottery ticket vending machine side car is configured to operate with the lottery ticket vending machine and to provide additional optional functions for the lottery ticket vending machine. In various embodiments, the lottery ticket vending machine side car provides one or more of the following additional optional functions for the lottery ticket vending machine: (1) the ability to receive, read/scan, and store paper bet slips; (2) the ability to receive, read/scan/verify, and store paper currency; and/or (3) the ability to receive, read/scan/verify, and store coin currency.

For a better understanding of the present disclosure, example instant lottery tickets are first generally described herein.

Various known instant lottery tickets are single game instant lottery tickets. An example single game instant lottery ticket can include: (1) a ticket substrate having a front surface and a back surface; (2) a predefined scratch-off area on the front surface; (3) variable lottery game indicia printed on the predefined scratch-off area; (4) a scratch-off coating ("SOC") covering the variable lottery game indicia and the predefined scratch-off area; and (5) variable instant lottery ticket information indicia printed on the back surface. The instant lottery ticket information indicia can include text, one or more ticket numbers, one or more ticket codes (such as barcodes), and other instant lottery ticket information that is in human readable and machine readable forms. Certain of the instant lottery ticket information: (a) identifies the instant lottery ticket; (b) the set, run, and/or pack of instant lottery tickets that the instant lottery ticket is part of; and (c) other inventory control information. Various known single game instant lottery tickets include multiple predefined scratch-off areas, multiple sets of variable lottery game indicia printed on the predefined scratch-off areas, and multiple SOCs covering the variable lottery game indicia sets. Various known instant lottery tickets are multi-game instant lottery tickets and can be larger than single game tickets. Instant lottery tickets can also be of the known pull tab type. Instant lottery tickets can have a width that varies from 2 to 4 inches and a length that varies from 2 to 12 inches. The term lottery ticket as used herein is intended to cover these various different types and other types of lottery tickets that can be dispensed in a same or similar manner as these types of lottery tickets.

Various lottery tickets are often arranged after manufacture (which includes after complete printing) in lottery ticket packs for storage, organization, sorting, picking, shipping to lottery ticket distributors or ticket retailers, and activation. Instant lottery ticket packs can include a plurality of lottery tickets (that are all of the same type, same size, and for the same game(s), and can be protected for storage and shipping by a transparent pack wrapping, such as transparent plastic wrapping, securely wrapped around the plurality of lottery tickets. A pack of lottery tickets can include all of the lottery tickets connected to each other but joined by perforations. Such lottery tickets of a pack can be detached from each other along such perforations. While tickets of each pack are often manufactured in a continuous strip that is fan-folded for convenient supply, the packs can be in other forms such as in a roll form. These packs in the fan-folded form or in the roll form are configured to dispensing via a lottery ticket vending machine.

Turning now to FIGS. 1, 2, 3, 4, 5, 6, 7, 8, and 9, a lottery ticket dispensing system 50 including a lottery ticket vending machine 100 and a lottery ticket vending machine side car 1100 of one example embodiment of the present disclosure. The lottery ticket vending machine 100 may be referred to herein as the "ticket vending machine" or the "vending machine" for brevity. The lottery ticket vending machine side car 1100 may be referred to herein as the "side car" for brevity.

The illustrated example ticket vending machine 100 includes: (a) a machine housing 110 including a front door 200; (b) three ticket drawer columns 300*a*, 300*b*, and 300*c* positioned in and supported by the machine housing 110; and (c) three separate and independently movable ticket bursters 400*a*, 400*b*, and 400*c* positioned in the machine housing 110 and supported by burster supports (not labeled) positioned in and supported by the machine housing 110. The front door 200 includes a ticket collection receptacle 250 configured to receive separated lottery tickets from each of the ticket bursters 400*a*, 400*b*, and 400*c*. The quantity, positions, sizes, and configurations of the ticket drawer columns and the ticket bursters can vary in accordance with the present disclosure.

It should be appreciated that the ticket vending machine 100 includes various other components that are conventional in the industry and/or that would be readily apparent to those of ordinary skill in the art. For example, the ticket vending machine 100 can include: (1) various electronic components (not shown) some of which can be contained in an electronic component holder (not labeled) positioned in and supported by the machine housing 110; and (2) various purchaser interface components (not labeled) that are part of the front door 200 of the machine housing 110. These components are only briefly described herein for brevity. Such electronic components can be arranged in any suitable manner. The electronic component holder can be in the form of a slide-out drawer to facilitate access to the various electronic components contained therein. The electronic components can form part of the control system for the ticket vending machine 100. Various electronic components can also be positioned in the machine housing 110 outside of the electrical component holder. The electronic components can include one or more controllers 160 that control the operation of the ticket vending machine 100 including the movable ticket bursters 400*a*, 400*b*, and 400*c* as further discussed herein to facilitate the dispensing of each requested lottery ticket and the determination of any deformities in the edges of the lottery tickets (as further described below). The controller(s) can be any suitable type of controller (such as a programmable logic controller) that includes any suitable processing device(s) (such as a microprocessor, a microcontroller-based platform, an integrated circuit, or an application-specific integrated circuit) and any suitable memory device(s) (such as random access memory, read-only memory, or flash memory). The memory device(s) store(s) instructions executable by the processing device(s) to control operation of the ticket vending machine 100. The purchaser interface components include one or more display devices, one or more input devices, and one or more payment acceptors. The purchaser interface components enable purchasers to use such components to determine the lottery tickets available from the ticket vending machine 100, and to select and pay for any of those lottery tickets held by the ticket vending machine 100 that the purchaser desires to obtain. The purchaser interface components can display images and information to inform purchasers of the different lottery tickets available from the ticket vending machine 100 and to assist in completing the selection and purchase of such lottery tickets. These electronic components and purchaser interface components can take many different forms as well known in the industry, and are thus not described in detail herein for brevity.

Figure 2:
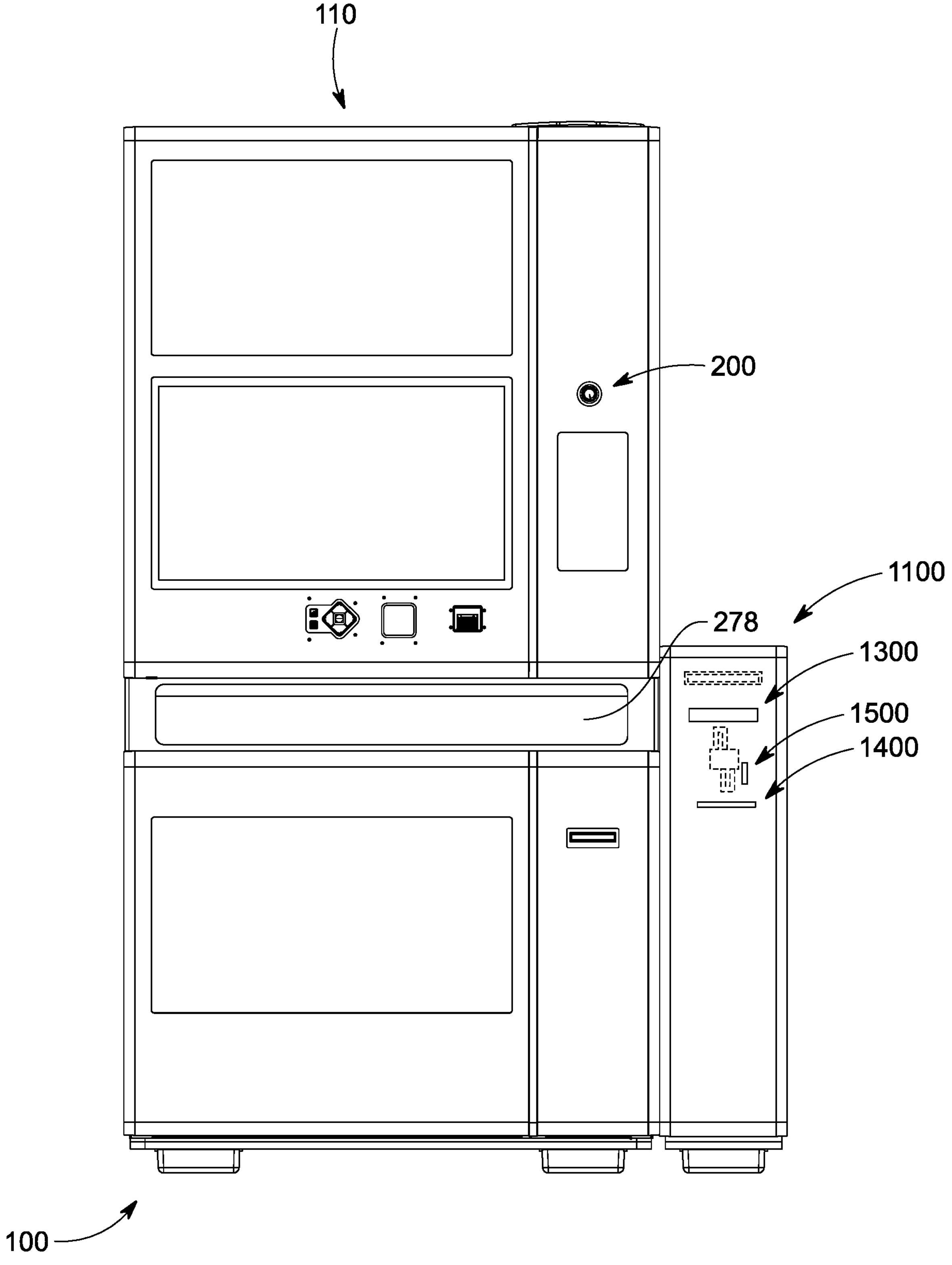
FIG. 2 is a front perspective view of the lottery ticket vending machine and the lottery ticket vending machine side car of FIG. 1, shown connected to the lottery ticket vending machine.
Figure 3:
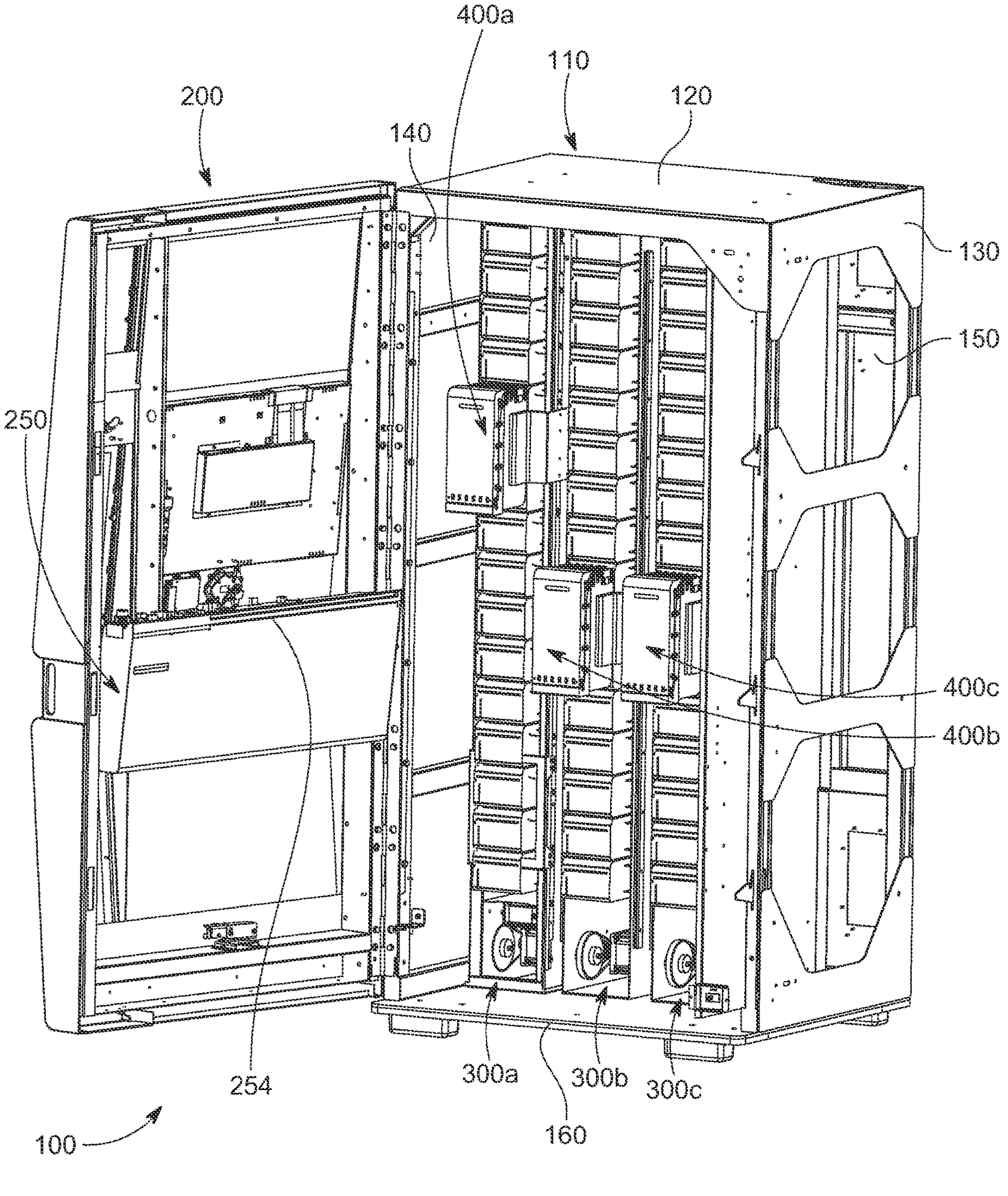
FIG. 3 is a front perspective view of the lottery ticket vending machine of FIG. 1 shown with the front door thereof in an open position, shown with a left side wall panel thereof removed, showing three ticket drawer columns and three movable ticket bursters respectively associated with the three ticket drawer columns, and showing a ticket collection receptacle of the front door.
Figure 4:
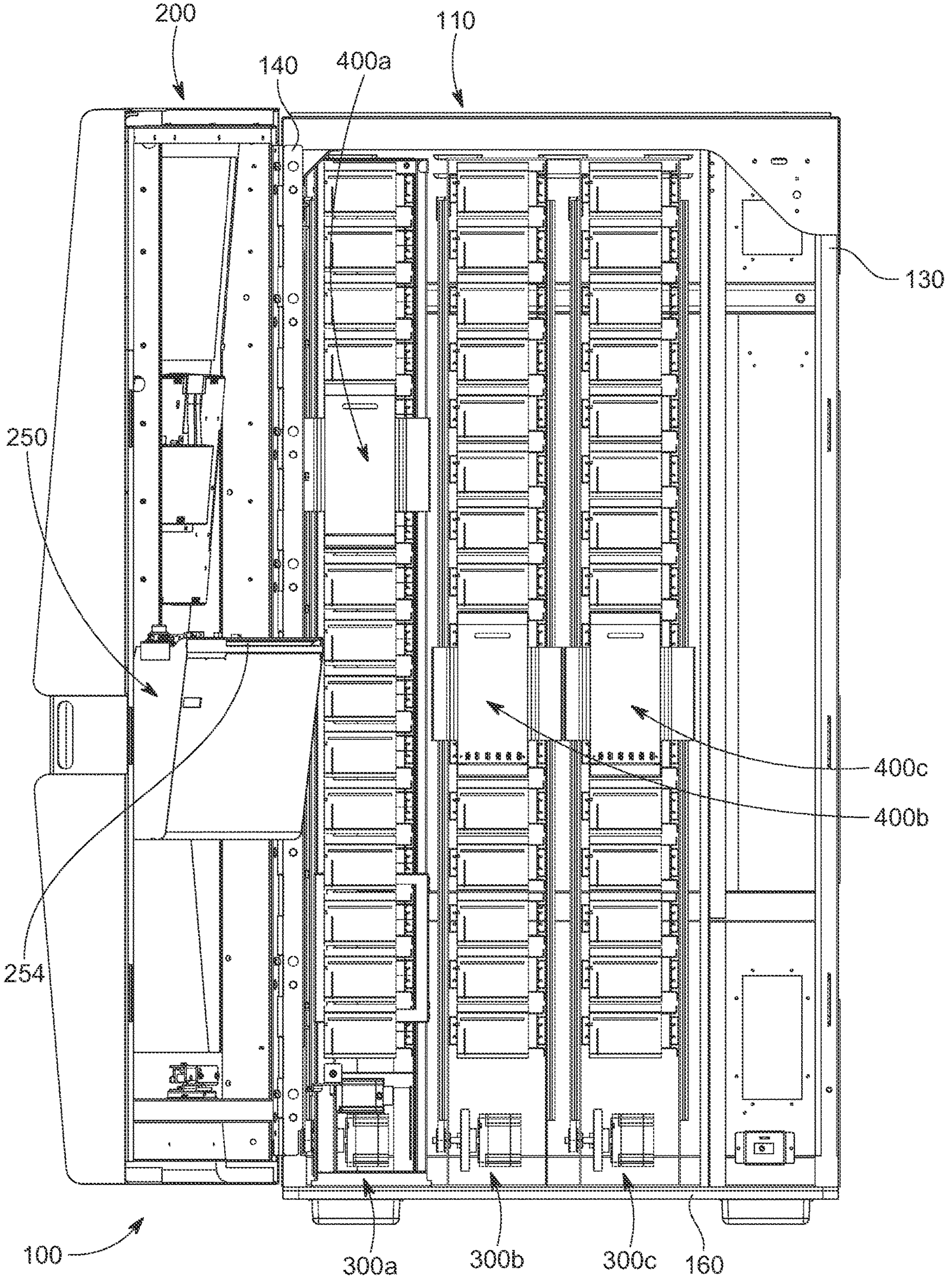
FIG. 4 is a front view of the lottery ticket vending machine of FIG. 1 shown with the front door thereof in the open position, shown with the left side wall panel thereof removed, showing the three ticket drawer columns and the three movable ticket bursters respectively associated with the three ticket drawer columns, and showing the ticket collection receptacle of the front door.

In this illustrated example embodiment, the machine housing 110 includes a top wall 120, spaced-apart side walls 130 and 140, a rear wall 150, a base 160, and the openable front door 200 pivotally connected to the side wall 140. The base 160 is configured to rest on a floor or other suitable support. The machine housing 110 includes suitable vertically extending supports (not labeled) configured to hold and support the respective ticket drawer columns 300*a*, 300*b*, and 300*c*. The front door 200 is moveable from a closed and locked position covering the open front face of the machine housing 110 as shown in FIG. 2 to an open position allowing access to the interior of the machine housing 110 as shown in FIGS. 3 and 4. The front door 200 is mounted by hinges (not labeled) to the side wall 140 of the machine housing 110. A suitable locking mechanism (not shown) is mounted on the front door 200 and the side wall 130 of the machine housing 110 to facilitate locking of the front door 200 in the closed position. When the front door 200 is closed and locked, the interior of the machine housing 110 is generally secured so as to be inaccessible except by an authorized person. The front door 200 can include one or more areas for any components supported by the front door and/or that are contained in and/or protected by the structure of the front door 200. The front door 200 can include one or more openings such as for a glass panel that enables people to see into the machine housing 110 and for one or more of the purchaser interface components (such as those described below). The size and configuration of the machine housing can vary in accordance with the present disclosure.

The ticket collection receptacle 250 of the front door 200 is configured to receive lottery tickets from each of the movable ticket bursters 400*a*, 400*b*, and 400*c*. The ticket collection receptacle 250 is configured to hold each lottery ticket received from the movable ticket bursters to enable the respective purchaser to retrieve the dispensed lottery ticket from the ticket collection receptacle 250. The ticket collection receptacle defines an elongated horizontally extending ticket receiving slot 254 (best seen in FIGS. 3 and 4). The ticket collection receptacle 250 and the front door define an elongated horizontally extending purchase ticket retrieval slot 278 (best seen in FIG. 2). The purchase ticket retrieval slot 278 is (and needs to be) large enough so that a purchaser can insert the purchaser's hand through the purchase ticket retrieval slot 278 to retrieve lottery tickets that are dispensed into the ticket collection receptacle 250. The ticket receiving slot 254 is (and needs to be) small enough so that a purchaser cannot insert the purchaser's hand through the ticket receiving slot 254 and thereby cannot access any of the ticket drawers of the ticket drawer columns 300*a*, 300*b*, or 300*c*. The position, size, and configuration of the ticket collection receptacle can vary in accordance with the present disclosure.

Each of the ticket drawer columns 300*a*, 300*b*, and 300*c* are identical in this example embodiment. For brevity, only ticket drawer column 300*a* is described in detail herein. Likewise, the three movable ticket bursters 400*a*, 400*b*, and 400*c* are identical in this example embodiment. For brevity, only ticket burster 400*a* associated with the ticket drawer column 300*a* is described herein.

Ticket drawer column 300*a* includes a series of aligned ticket drawers (not individually labeled) that are vertically stacked in the column. Each of the ticket drawers is configured to hold one or more packs of lottery tickets (such as instant lottery tickets) for subsequent dispensing by the ticket vending machine 100. The ticket drawers can vary in quantity, size, and configuration depending upon the particular size of the ticket vending machine 100 and the quantity, size, and shapes of the lottery tickets that the ticket vending machine 100 can or will dispense. Each ticket drawer is configured to hold lottery tickets (such as instant lottery tickets) for selection by the purchasers. In various embodiments, the different ticket drawers can hold different lottery ticket packs for different lottery games, but it should be appreciated that two or more ticket drawers can hold the same type of lottery tickets. In various embodiments, each of the ticket drawers is configured to feed each lottery ticket held by that ticket drawer into the associated ticket burster 400*a* after the ticket burster 400*a* is moved into alignment with such ticket drawer for receipt, bursting, and dispensing of that lottery ticket. This feeding can be done via suitable mechanisms in the ticket drawer and/or by a mechanism in the burster that actuates such mechanisms in the ticket drawer.

Bursting of the lottery ticket is the industry term for separating a lottery ticket from a pack of lottery tickets held in a ticket drawer. In this example embodiment, the ticket drawers do not burst the lottery tickets and do not need any mechanisms for bursting the lottery tickets, but rather the moveable ticket burster 400*a* bursts the lottery tickets received from the ticket drawers in the ticket drawer column 300*a* into that ticket burster 400*a*.

Figure 5:
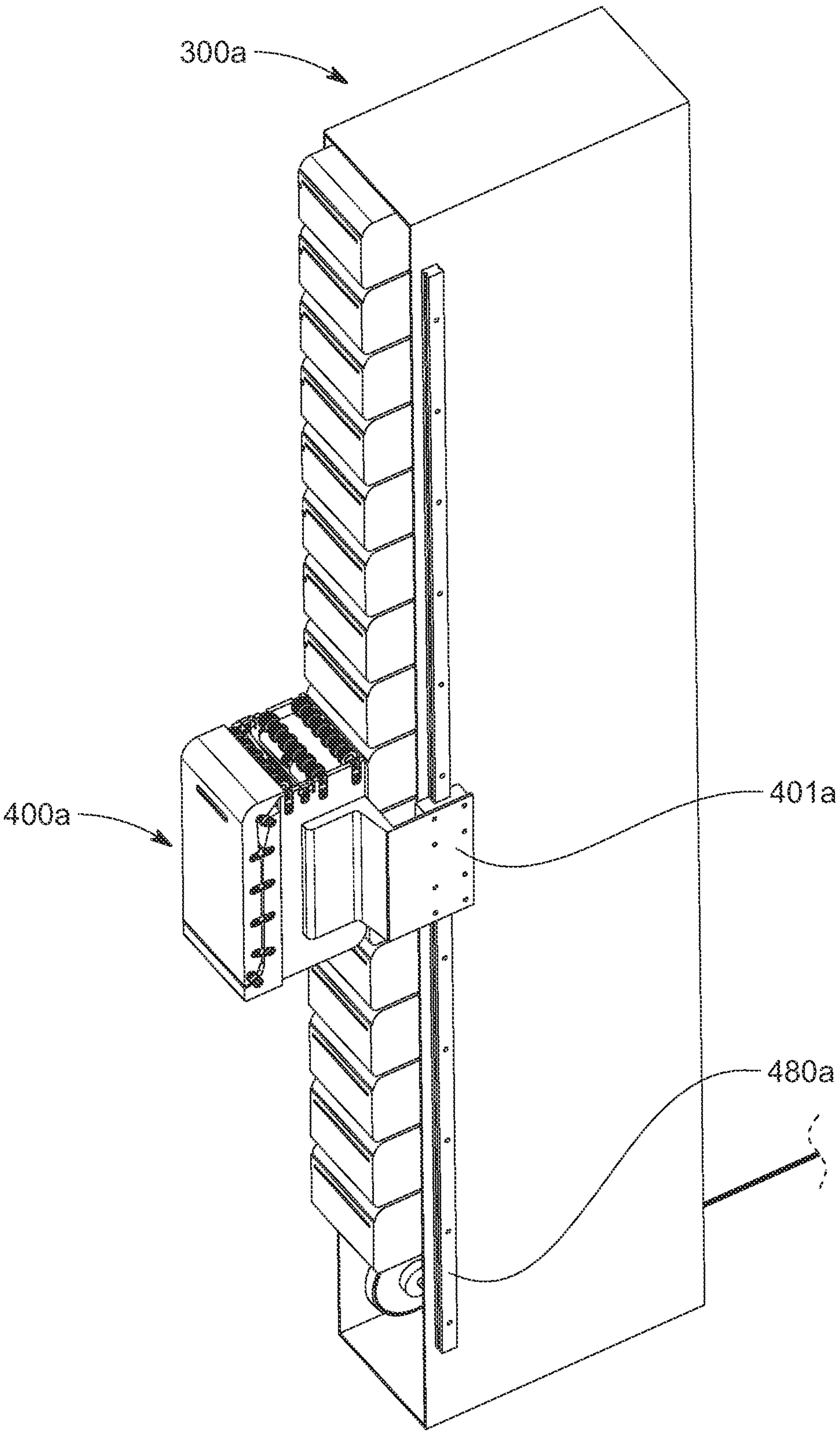
FIG. 5 is an enlarged perspective view of one of the ticket drawer columns and the ticket burster associated with that ticket drawer column of the lottery ticket vending machine of FIG. 1.
Figure 6:
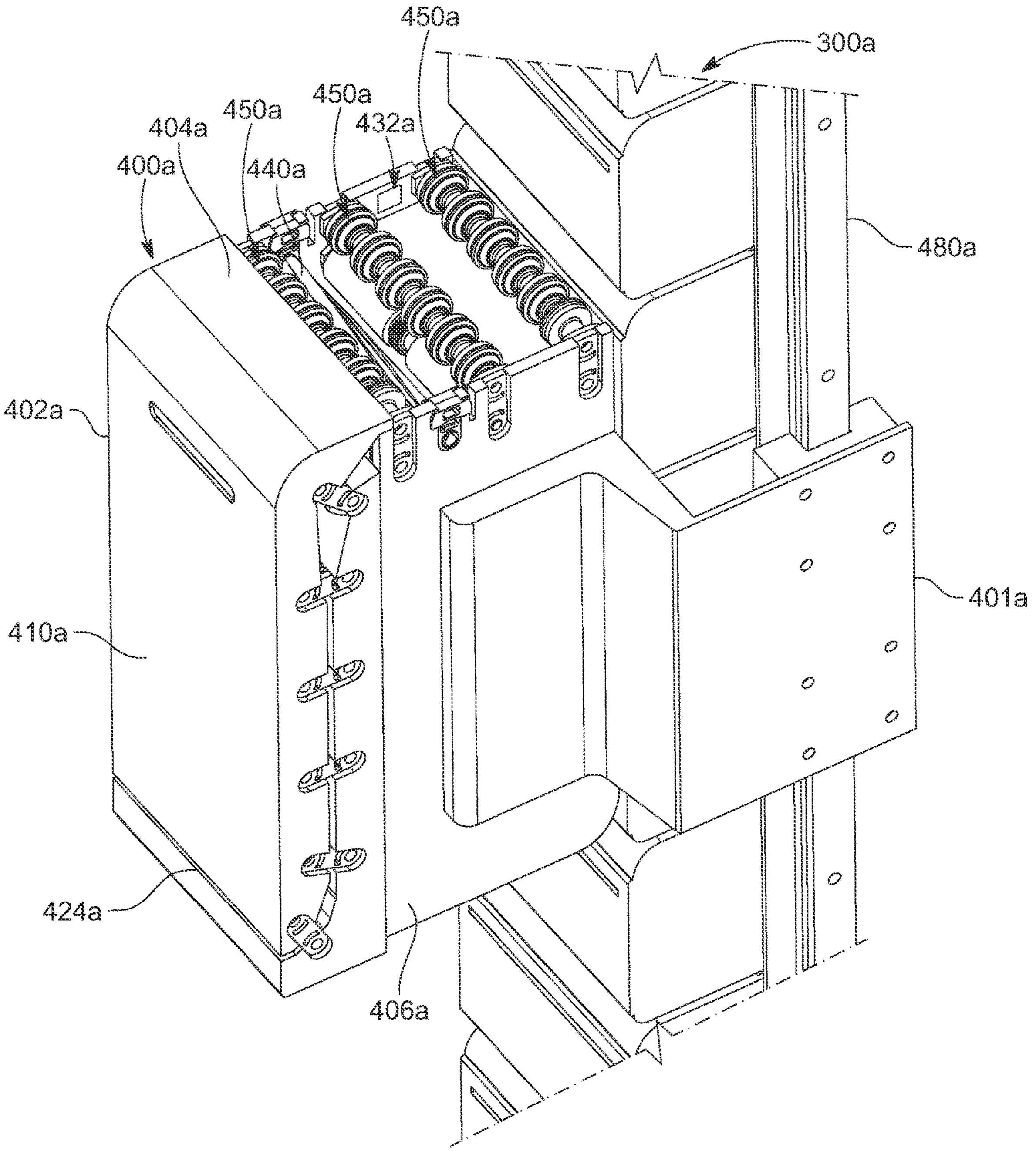
FIG. 6 is an enlarged fragmentary top perspective view of the ticket drawer column and the ticket burster of FIG. 5.
Figure 7:
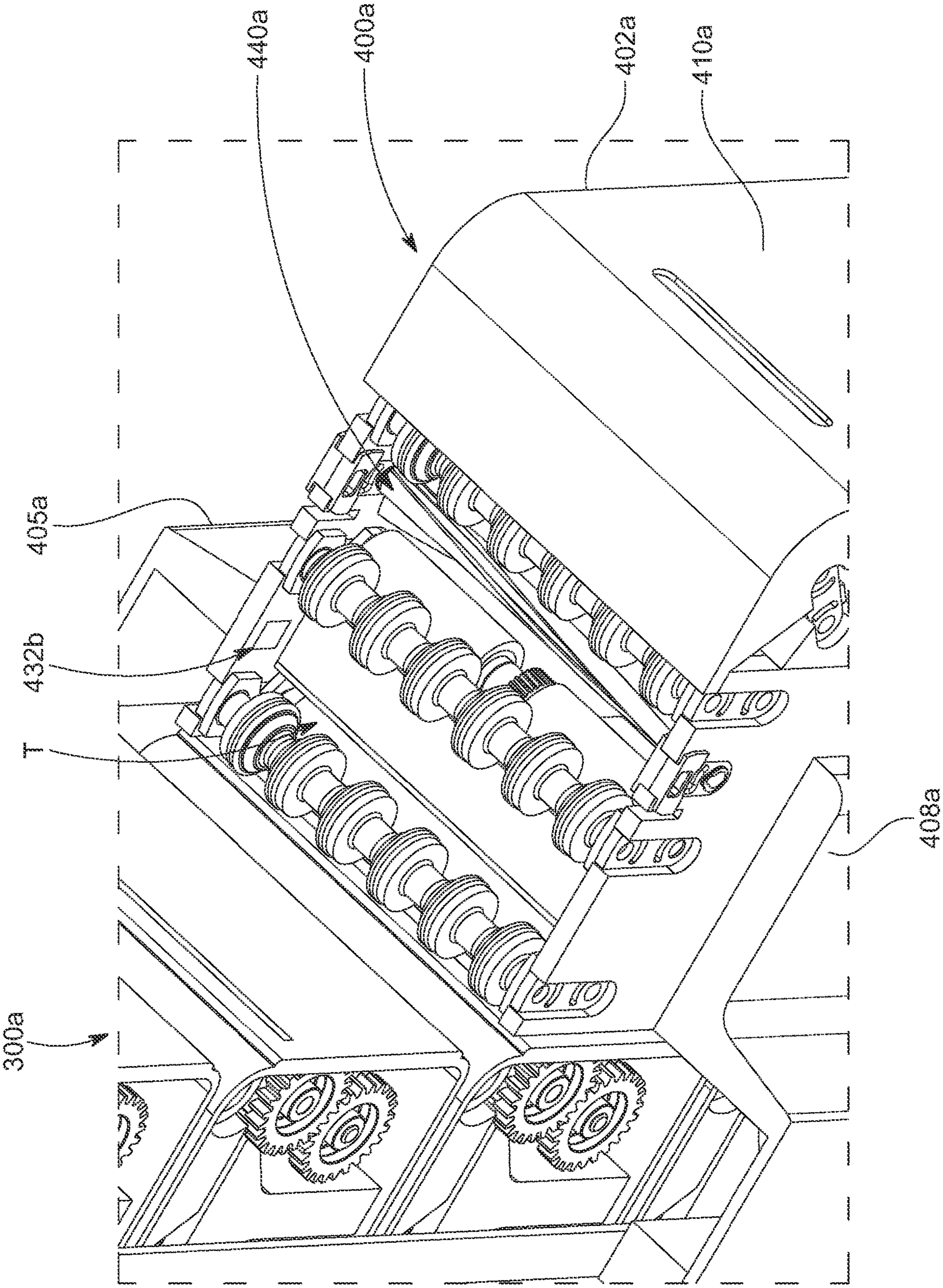
FIG. 7 is an enlarged fragmentary top view of the ticket drawer column and the ticket burster of FIG. 5.
Figure 8:
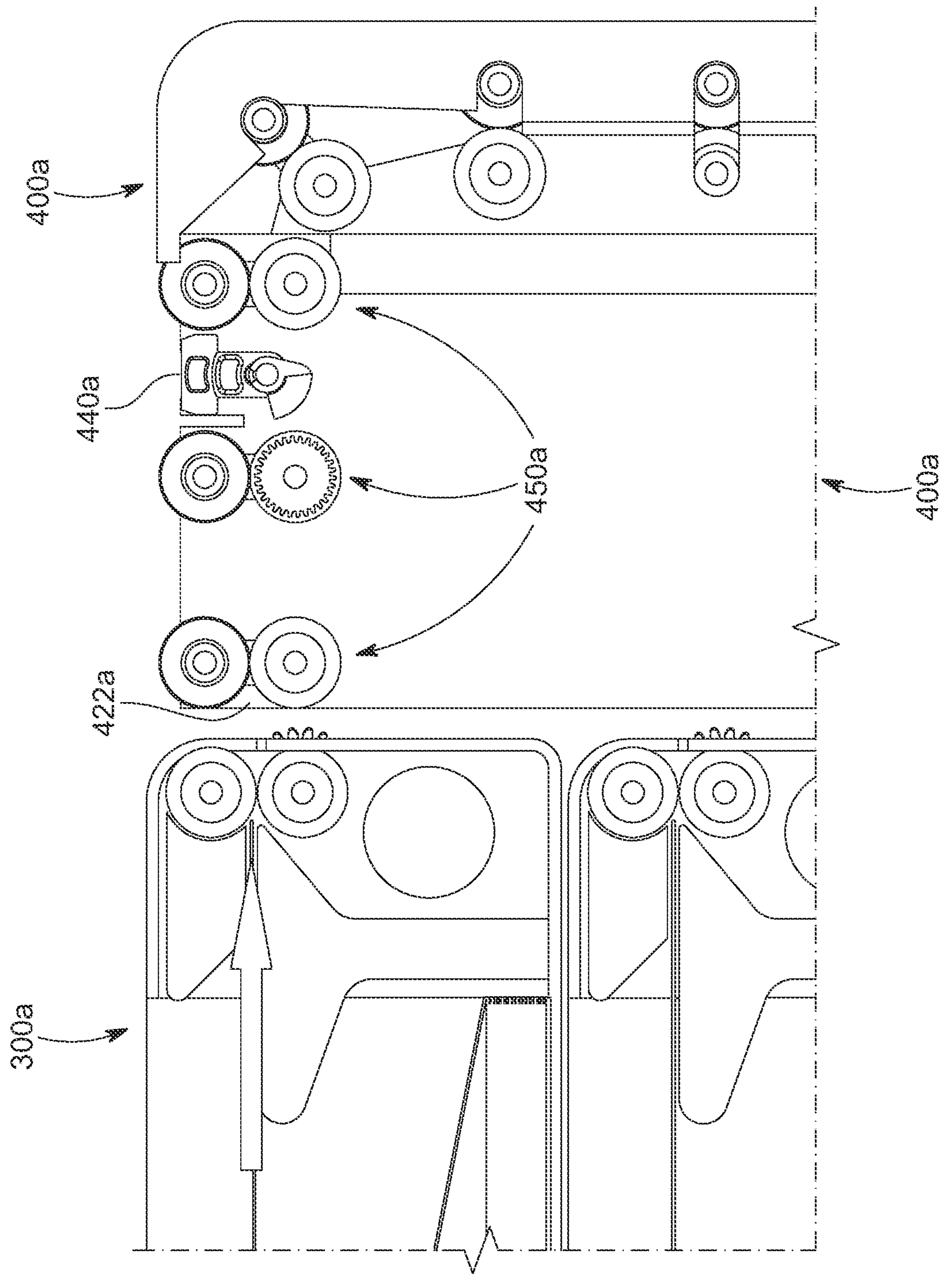
FIG. 8 is a further enlarged fragmentary side view of the ticket drawer column and the ticket burster of FIG. 5.

As best shown in FIGS. 3, 4, and 5, the movable ticket burster 400*a* is supported by one or more burster supporters (such as burster supporter 480*a*). The burster supporters can be any suitable structure(s) that support(s) the ticket burster 400*a* in a manner that enables the ticket burster 400*a* to vertically move to any of the different ticket receipt positions that are associated with and in alignment with the respective ticket drawers of the ticket drawer column 300*a*. Each of the burster supporters also supports the ticket burster 400*a* in a manner that enables the ticket burster 400*a* to vertically move into alignment with the ticket receptacle 250.

The ticket vending machine 100 includes one or more actuators such as motors (not shown) that control movement of the ticket burster 400*a* under control of the controller of the ticket vending machine 100 and/or the controller of the ticket burster 400*a*. In this example, an actuator such as a motor (not labeled) is mounted at the bottom of the ticket drawer column 300*a* and coupled to the ticket burster 400*a* by suitable linkages (such as but not limited to pulleys and a drive belt (not labeled)). The actuator is configured to move the ticket burster 400*a* under the control of the controller(s) in the vertical (e.g., up and down) directions. The movable ticket burster 400*a* is thus moveable, via the actuator and linkages on the ticket burster supporters, to different vertical locations including a plurality of the locations respectively associated and aligned with each of the ticket drawers of the ticket drawer column 300*a* such that the ticket burster 400*a* is positioned to receive one or more of the lottery tickets stored in each respective ticket drawer of the ticket drawer column 300*a* for obtaining and dispensing that lottery ticket into the ticket receptacle 400 for the purchaser as requested by the purchaser.

As best shown in FIGS. 5, 6, 7, and 8, this example movable ticket burster 400*a* generally includes: (a) a burster housing 402*a*; (b) one or more burster supporter connecters (such as burster support connector 404*a* connecting the burster housing 402*a* and the burster supporter 480*a*); (c) one or more sensors (not shown) supported by the burster housing 402*a*; (d) a ticket cutter 440*a* supported by the burster housing 402*a*; (e) a plurality of ticket engagers 450*a* supported by the burster housing 402*a*; and (f) a burster controller (not shown). The size and configuration of the ticket burster can vary in accordance with the present disclosure. While this example includes two tape sensors, as further discussed below, the quantity of tape sensors and the position of the tape sensor(s) in the buster can vary in accordance with the present disclosure.

More specifically, the burster housing 402*a* generally includes a top member 404*a*, spaced-apart side members 406*a* and 408*a*, a front member 410*a*, a rear member 412*a*, and a bottom member 414*a*. The burster housing 402*a* also includes a plurality of internal members (not individually labeled) that define a ticket inlet 422*a*, through which the ticket burster 400*a* is configured to receive lottery tickets from a ticket drawer of the ticket drawer column 300*a*, a ticket outlet 424*a* through which the ticket burster 400*a* is configured to dispense the received lottery tickets into the ticket collection receptacle 250, and a ticket movement path (not labeled) extending from the ticket inlet 422*a* to the ticket outlet 424*a* and through which each lottery ticket is moved through the ticket burster 400*a*.

The ticket cutter 440*a* is positioned in the burster housing 402*a* and configured to rotate to cut the perforations or tape connecting each lottery ticket that moves along the ticket movement path in the ticket burster 400*a* to the next lottery ticket of the strip or strips of lottery tickets received from the respective ticket drawer. The ticket cutter 440*a* is configured to make such cuts along the perforations or tape between the two connected lottery tickets of such strip or strips. The ticket cutter 440*a* is controlled by the burster controller and/or the controller of the ticket vending machine 100. In this example embodiment, the ticket cutter 440*a* is inwardly positioned (i.e., positioned downstream) from the ticket inlet 422*a*. After the ticket cutter 440*a* cuts the lottery ticket requested by the purchaser from the respective ticket drawer, the ticket drawer can retract the portion of the next lottery ticket from the ticket burster 400*a* before the ticket burster 400*a* moves from the ticket receipt position aligned with that ticket drawer. In other embodiments, the ticket burster 400*a* can be configured such that the ticket cutter is positioned closer to or on the other side of the ticket inlet (i.e., positioned upstream of the ticket inlet) such that after the ticket cutter cuts the lottery ticket along the perforations or tape connecting that lottery ticket to the next lottery ticket, the ticket drawer may not need to withdraw the next lottery ticket or may only need to withdraw the next lottery ticket a relatively small distance. The position, size, and configuration of the ticket cutter can thus vary in accordance with the present disclosure.

In other embodiments, the ticket burster 400*a* can be configured such that the burster housing 402*a* is rotatable about a horizontal axis to separate (via a tearing and/or twisting motion) each lottery ticket along the perforations connecting that lottery ticket to the next lottery ticket. In such embodiments, the ticket drawer may not need to withdraw the next lottery ticket or may only need to withdraw the next lottery ticket a relatively small distance. In such embodiments, the ticket burster may not need a ticket cutter.

It should be appreciated that the ticket burster 400*a* is thus configured to burst the perforations (or tape) between the lottery ticket being dispensed and the next lottery ticket so as to enable the dispensed lottery ticket to be dispensed into the ticket receptacle 250. This prevents a person from improperly tearing a lottery ticket or being able to pull an extended number of lottery tickets from one or more of the ticket packs in one of the ticket drawers. It should be appreciated that the ticket burster 400*a* can be moved to a dispensing location for each lottery ticket dispensed, or for only certain of the lottery tickets dispensed. It should also be appreciated that the ticket burster can moved to a different location for any lottery ticket that is deemed to be bad or non-dispensable for any reason, and to deposit that ticket into a suitable rejection area.

It should be appreciated that the ticket vending machine of the present disclosure can have more than one ticket burster for each ticket drawer column such that they can operate at the same time, or such that one or more ticket bursters are back-ups in case there is an issue with one of the other ticket bursters for that ticket drawer column.

The ticket engagers 450*a* in this example embodiment include multiple driven rollers (not labeled) and multiple guide rollers (not labeled). The driven rollers are rotated by suitable actuators such as motors (not shown) under the control of the burster controller and/or the controller of the ticket vending machine 100. The driven rollers and the guide rollers are configured to move (such as by pulling) and guide each lottery ticket along the ticket movement path and out of the ticket outlet 424*a*. In alternative embodiments, the ticket engagers are configured to grip and pull each lottery ticket from the respective ticket drawer.

The burster controller (not shown) can be any suitable type of controller (such as a programmable logic controller) that includes any suitable processing device(s) (such as a microprocessor, a microcontroller-based platform, an integrated circuit, or an application-specific integrated circuit) and any suitable memory device(s) (such as random access memory, read-only memory, or flash memory). The memory device(s) stores instructions executable by the processing device(s) to control operation of the ticket burster 400*a*. The burster controller can be hard wired or wirelessly connected to and in communication with the cutter 440*a*, the actuators for the driven rollers 450*a*, any actuators of the ticket burster 400*a* that cause the movement of the ticket burster 400*a* as further described below. In such embodiments, the burster controller can be wirelessly connected to and in communication with the controller of the ticket vending machine 100. In other embodiments, the ticket burster does not include a controller and is completely controlled by the controller of the ticket vending machine 100. In such embodiments, the controller of the ticket vending machine 100 can be hard wired to or wirelessly connected to and in communication with the cutter, the actuators for the driven rollers, any actuators on the ticket burster or the burster supporter that cause the movement of the ticket burster, and the sensor(s).

The ticket burster 400*a* can include one or more sensors (not shown) for sensing various different information. The sensors can scan upwardly or downwardly. The sensors can extend partially or fully along the entire width of the ticket burster. The sensors are configured to communicate data to the burster controller and/or the controller of the ticket vending machine 100. The burster controller and/or the controller of the ticket vending machine 100 are configured to receive and use and/or analyze this data. If the burster controller and/or the controller of the ticket vending machine 100 determines based on the data that an action needs to be taken, the burster controller and/or the controller of the ticket vending machine 100 can take one or more of the series of actions described above. In various embodiments, the sensors include a camera. In various embodiments, the sensors include a plurality of adjacent optical sensors configured to obtain data and send the data to the controller(s) for analysis. In various embodiments, the sensors include a compact image sensor ("CIS") reader that is configured to read bar codes on the lottery tickets.

The vending machine 100 is configured to be physically and electrically connected to the side car 1000. Thus, in this example embodiment, the vending machine 100 includes: (1) a physical connection assembly 900; and (2) an electrical connection and communication assembly 950. In various embodiments, the physical connection assembly 900 is connected to a physical connection assembly 1150 of the side car 1000 to facilitate the physical connection between the side car 1000 and the vending machine 100 such as further described below. It should be appreciated that any suitable physical connection assembly 900 can be employed. In various embodiments, the electrical connection and communication assembly 950 is connected to an electrical connection and communication assembly 1200 of the side car 1000 to facilitate the electrical connection and communication between the side car 1000 and the vending machine 100 such as further described below. It should be appreciated that any suitable electrical connection and communication assembly 950 can be employed.

Figure 9:
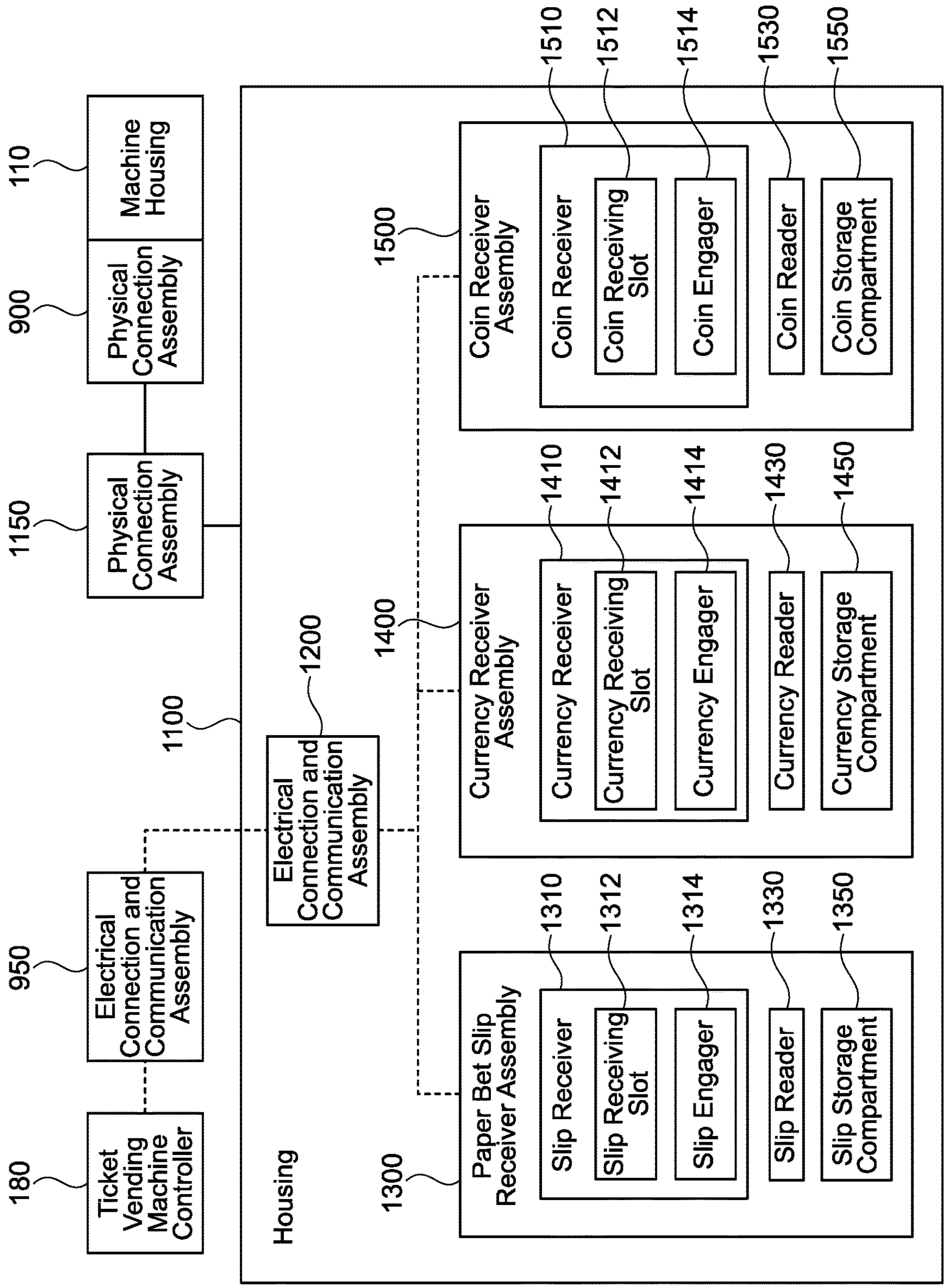
FIG. 9 is a diagrammatic view of certain of the components of the lottery ticket vending machine side car of FIG. 1.

As shown in FIGS. 1, 2, and 9, in this example embodiment, the side car 1000 includes: (1) a housing 1100; (2) a physical connection assembly 1150; (3) an electrical connection and communication assembly 1200; (4) a paper bet slip receiver assembly 1300; (5) a currency receiver assembly 1400; and (6) a coin receiver assembly 1500. In various embodiments, the side car 1000 includes one or more but not all of these assemblies. In other embodiments, the side car 1000 can include one or more additional assemblies that is/are configured to provide additional functionality to the lottery ticket vending machine 100.

More specifically, in this example embodiment, the housing 1100 of the side car 1000 includes a frame (not shown or labeled), a top wall (not labeled), spaced-apart side walls (not labeled), a rear wall (not labeled), a base (not labeled), and a front wall (not labeled). The base is configured to rest on a floor or other suitable support. Although not shown, one of the walls of the housing 110 is moveable from a closed and locked position to an open position to allow access to the interior of the housing 1100. Hinges (not shown) can be employed to mount the moveable wall to another wall or frame of the housing 1100. A suitable locking mechanism (not shown) can be mounted on the movable wall and the other wall or frame of the housing 1100 to facilitate locking of the movable wall in the closed position. When an operator closes and locks the movable wall, the interior of the housing 1100 of the side car 1000 is generally inaccessible except by an authorized person. In various embodiments, the side car 1000 can also include one or more interior doors configured to secure and to provide access to one or more assemblies of the side car 1000, such as the paper bet slip receiver assembly 1300, the currency receiver assembly 1400, the coin receiver assembly 1500, and/or the compartments thereof (described below). One or more suitable locking mechanisms (not shown) can be configured to facilitate locking of the interior door(s) in the closed position(s). The housing 1100 can be alternatively sized, shaped, and otherwise configured in accordance with the present disclosure. The housing 1100 is configured to be positioned adjacent to one side of the vending machine 100 such as shown. In other embodiments, the side car can be positioned on the opposite side of the housing of the vending machine or adjacent to the rear wall of the housing of the vending machine.

The physical connection assembly 1150 of the side car 1000 includes a suitable connection mechanism that is configured to physically connect the side car 1000 to the ticket vending machine 100. The physical connection assembly 1150 can include a suitable locking mechanism (not shown) that secures the side car 1000 to the vending machine 100 such that when an individual locks the physical connection assembly, an unauthorized person cannot disconnect the side car 1000 from the vending machine 100. It should be appreciated that the vending machine 100 can be flush with the side car 1000 or there can be a gap between the vending machine 1000 and the side car 1000. In various embodiments, the physical connection assembly 1150 is connected to the physical connection assembly 900 of the machine housing 110 to facilitate this physical connection. In various embodiments, the physical connection assembly 1150 is otherwise connected to facilitate an attachment of the side car 1000 directly to the housing 110 of the vending machine 100. It should thus be appreciated that any suitable physical connection assembly can be employed.

The electrical connection and communication assembly 1200 of the side car 1000 is configured to electrically connect the side car 1000 to the ticket vending machine 100. The electrical connection and communication assembly 1200 is configured to provide electrical signals from the components of the side car 100 to the vending machine controller 180. The electrical connection and communication assembly 1200 is also configured to provide electrical signals from the vending machine controller 180 to the components of the side car 100. In various embodiments, the electrical connection and communication assembly 1200 includes a hard wired connection to the electrical connection and communication assembly 950 of the vending machine 100 via one or more wires (not shown). The one or more wires of the electrical connection and communication assembly 1200 can pass through an opening (not shown) in one of the walls of the side car 1000 and an opening in one of the side or rear walls of the housing 110 of the vending machine 100. The electrical connection and communication assembly 1200 can be connected to one or more electrical connectors (not shown) of the electrical connection and communication assembly 950 of the vending machine 100. The wires and the electrical connectors can vary in quantity, size, and configuration. It should also be appreciated that the connection and/or communication can be wireless or partly wireless in other embodiments in accordance with the present disclosure. The electrical connection and communication assembly 1200 of the side car 1000 is thus configured to facilitate communication with the ticket vending machine 100.

The paper bet slip receiver assembly 1300 is configured to receive paper bet slips from purchasers of lottery tickets from the vending machine 100. As indicated above, the vending machine 100 is configured to enable purchasers to purchase lottery tickets such as instant lottery tickets. Additionally, the vending machine 100 can be configured to enable purchasers to purchase draw lottery tickets for draw lottery games (via a draw lottery ticket printing assembly (not shown) in the vending machine 100). Draw lottery tickets for draw lottery games require the player to pick one or more numbers for each of the plays of the draw lottery games (either directly or via a quick pick). Paper bet slips are widely used to enable players to pick such numbers. By providing the paper bet slip receiver assembly 1300 in the side car 1000, the lottery ticket dispensing system of the present disclosure thus enables the vending machine 100 to receive such selection of the player numbers via such bet slips, and then to subsequently print and dispense such draw lottery tickets.

The paper bet slip receiver assembly 1300 of the side car 1000 thus adds this additional functionality to the vending machine 100. In this example embodiment, the paper bet slip receiver assembly 1300 includes a slip receiver 1310, a slip reader 1330, and a slip storage compartment 1350.

The slip receiver 1310 includes a section that defines a slip receiving slot 1312 and a slip engager 1314. The slip receiving slot 1312 can include an elongated horizontally extending slot through which the purchasers can insert paper bet slips. The slip engager 1314 is configured to guide each paper bet slip through the slip receiving slot 1312, through or adjacent to the slip reader 1330, and into the slip storage compartment 1350. In various embodiments, the slip engager 1314 includes multiple driven rollers (not shown) and multiple guide rollers (not shown). Suitable actuators such as motors (not shown) controlled by the ticket vending machine controller 180 can rotate the driven rollers. The driven rollers and the guide rollers are configured to grip and pull the paper bet slip through the slip receiving slot 1312. The driven rollers and the guide rollers are configured to move (such as by pulling) and guide the paper bet slip through the slip reader 1330 and into the slip storage compartment 1350.

The slip reader 1310 is configured to obtain slip data and communicate said data to the vending machine controller 180 via the electrical connection and communication assembly 1200. It should be appreciated that the slip reader 1330 can be configured to read different types of paper bet slips. In various embodiments, the slip reader 1330 includes one or more sensors configured to obtain data from the paper bet slip and send the data to the vending machine controller 180 via the electrical connection and communication assembly 1200. The sensors can scan upwardly or downwardly. In various embodiments, the sensors include a camera. In various embodiments, the sensors include a plurality of adjacent optical sensors.

The slip storage compartment 1350 is configured to hold the paper bet slips that the purchasers insert into the slip receiver 1310. It should be appreciated that the slip storage compartment 1350 can vary in size and shape depending upon the quantity, size, and shape of the paper bet slips.

The position, size, and configuration of the paper bet slip receiver assembly 1300 can vary in accordance with the present disclosure.

The currency receiver assembly 1400 includes a currency receiver 1410, a currency reader 1430, and a currency storage compartment 1450.

The currency receiver 1410 is configured to receive currency from the purchasers. In this example embodiment, the currency receiver 1410 includes a section that defines a currency receiving slot 1412 and a currency engager 1414. The currency receiving slot 1412 can be an elongated horizontally extending slot through which the purchaser inserts a piece of paper currency. The currency receiving slot 1412 is (and needs to be) small enough so that a purchaser cannot insert the purchaser's hand through the currency receiving slot and thereby cannot access any currency in the currency storage compartment 1450. The currency engager 1414 is configured to guide the currency through the currency receiving slot 1412, through or adjacent to the currency reader 1430, and into the currency storage compartment 1450. In various embodiments, the currency engager 1414 includes multiple driven rollers (not shown) and multiple guide rollers (not shown). Suitable actuators such as motors (not shown) controlled by the ticket vending machine controller 180 rotate the driven rollers. The driven rollers and the guide rollers are configured to grip and pull the currency through the currency receiving slot 1412. The driven rollers and the guide rollers are configured to move (such as by pulling) and guide the currency through or adjacent to the currency reader 1430 and into the currency storage compartment 1450.

The currency reader 1430 is configured to obtain currency data and communicate said data to the ticket vending machine controller via the electrical connection and communication assembly 1200. In various embodiments, the currency reader 1430 includes one or more sensors (not shown) configured to obtain data about the value of the paper currency and send the data to the ticket vending machine controller 180 via the electrical connection and communication assembly 1200. The sensors can scan upwardly or downwardly. In various embodiments, the sensors include a plurality of adjacent optical sensors.

The currency storage compartment 1450 is configured to hold the currency that the purchaser inserts into the currency receiver. It should be appreciated that the currency storage compartment can vary in size and shape depending upon the quantity, size, and shape of the currency. In various embodiments, the currency storage compartment 1450 can include a currency sorter (not shown) and distinct compartments (not shown) for each type of currency.

The position, size, and configuration of the currency receiver assembly 1400 can vary in accordance with the present disclosure.

The coin receiver assembly 1500 includes a coin receiver 1510, a coin reader 1514, and a coin storage compartment 1550.

The coin receiver 1510 is configured to receive coins from the purchasers. In this example embodiment, the coin receiver 1510 includes a section that defines a coin receiving slot 1515 and a coin path (not shown). The coin receiving slot 1512 includes s an elongated vertically extending slot through which the purchasers can insert coins. The coin receiving slot 1512 is (and needs to be) small enough so that a purchaser cannot insert the purchaser's hand through the coin receiving slot 1512 and thereby cannot access the coin storage compartment 1550. The coin path is configured to guide the coin from the coin receiving slot 1512, through or adjacent to the coin reader 1530, and into the coin storage compartment 1550. In various embodiments, the coin path defines a narrow ramp configured to seat the coin.

The coin reader 1530 is configured to obtain coin data and communicate said data to the ticket vending machine controller 180 via the electrical connection and communication assembly 1200. In various embodiments, the coin reader 1530 includes one or more sensors configured to obtain data about the value of the coin and send the data to the ticket vending machine controller 180 via the electrical connection and communication assembly 1200. In various embodiments, the sensors can include optical sensors and electromagnetic sensors. It should be appreciated that the coin reader 1530 can be configured to read a single type of coin or multiple different types of coins.

The coin storage compartment 1550 is configured to hold the coins that the purchasers insert into the coin receiver 1510. In various embodiments, the coin storage compartment 1550 can include a coin sorter (not shown) and distinct compartments (not shown) for each different type of coin. It should be appreciated that the coin storage compartment 1550 can vary in size and shape depending upon the quantity, size, and shape of the coins.

The position, size, and configuration of the coin receiver assembly 1500 can vary in accordance with the present disclosure.

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The claims are as follows:

1. A lottery ticket dispensing system comprising:

a lottery ticket vending machine comprising:

a first housing comprising a frame, a top wall connected to the frame, spaced-apart side walls connected to the frame, a rear wall connected to the frame, a base connected to the frame and configured to rest on a floor, and a front door connected to the frame, a ticket drawer column in the first housing, the ticket drawer column comprising a plurality of ticket drawers, each of the ticket drawers configured to hold a strip of lottery tickets, a ticket burster in the first housing, the ticket burster defining a ticket inlet and a ticket outlet, the ticket burster movable to a plurality of different ticket receipt positions, each different ticket receipt position associated with and in alignment with a different one of the ticket drawers, and a controller configured to control movement of the ticket burster to the different ticket receipt positions and other operations of the ticket burster; and a side car comprising:

a second housing comprising a frame, a top wall connected to the frame, spaced-apart side walls connected to the frame, a rear wall connected to the frame, a base connected to the frame and configured to rest on the floor, and a front wall connected to the frame, wherein one of the side walls of the side car in configured to be positioned adjacent to one of the side walls of the first housing of the lottery ticket vending machine, wherein one of the other walls of the second housing is moveable from a closed and locked position to an open position to allow access to an interior of the second housing, a physical connection assembly configured to connect the side car to the first housing of the lottery ticket vending machine, an electrical connection and communication assembly configured to send data to the controller, and at least one of a paper bet slip receiver assembly, a currency receiver assembly, and a coin receiver assembly.

2. The lottery ticket dispensing system of claim 1, wherein the paper bet slip receiver assembly comprises:

a slip receiver, a slip reader, and a slip storage compartment.

3. The lottery ticket dispensing system of claim 2, wherein the slip receiver comprises:

a section defining a slip receiving slot, and a bet slip engager.

4. The lottery ticket dispensing system of claim 1, wherein the currency receiver assembly comprises:

a currency receiver, a currency reader, and a currency storage compartment.

5. The lottery ticket dispensing system of claim 4, wherein said currency receiver comprises:

a section defining a currency receiving slot, and a currency engager.

6. The lottery ticket dispensing system of claim 1, wherein the coin reader assembly comprises:

a coin receiver, a coin reader, and a coin storage compartment.

7. The lottery ticket dispensing system of claim 1, wherein said coin receiver comprises:

a section defining a coin receiving slot, and a coin path.

8. A lottery ticket dispensing system comprising:

a lottery ticket vending machine comprising:

a first housing comprising a frame, a top wall connected to the frame, spaced-apart side walls connected to the frame, a rear wall connected to the frame, a base connected to the frame and configured to rest on a floor, and a front door connected to the frame, a ticket drawer column in the first housing, the ticket drawer column comprising a plurality of ticket drawers, each of the ticket drawers configured to hold a strip of lottery tickets, a ticket burster in the first housing, the ticket burster defining a ticket inlet and a ticket outlet, the ticket burster movable to a plurality of different ticket receipt positions, each different ticket receipt position associated with and in alignment with a different one of the ticket drawers, and a controller configured to control movement of the ticket burster to the different ticket receipt positions and other operations of the ticket burster; and a side car comprising:

a second housing comprising a frame, a top wall connected to the frame, spaced-apart side walls connected to the frame, a rear wall connected to the frame, a base connected to the frame and configured to rest on the floor, and a front wall connected to the frame, wherein one of the side walls of the side car in configured to be positioned adjacent to one of the side walls of the first housing of the lottery ticket vending machine, wherein one of the other walls of the second housing is moveable from a closed and locked position to an open position to allow access to an interior of the second housing, a physical connection assembly configured to connect the side car to the first housing of the lottery ticket vending machine, and an electrical connection and communication assembly configured to send data to the controller.

9. The lottery ticket dispensing system of claim 8, wherein the side car comprises a paper bet slip receiver assembly.

10. The lottery ticket dispensing system of claim 8, wherein the side car comprises a currency receiver assembly.

11. The lottery ticket dispensing system of claim 8, wherein the side car comprises a coin receiver assembly.

12. The lottery ticket dispensing system of claim 8, wherein the electrical connection and communication assembly is connectable to an electrical connection and communication assembly of the lottery ticket vending machine.

13. A side car for a lottery ticket dispensing system including a lottery ticket vending machine having a first housing comprising a frame, a top wall connected to the frame, spaced-apart side walls connected to the frame, a rear wall connected to the frame, a base connected to the frame and configured to rest on a floor, and a front door connected to the frame, a plurality of ticket drawers in the first housing, each of the ticket drawers configured to hold a strip of lottery tickets, a movable ticket burster in the first housing, and a controller configured to control movement of the ticket burster to the different ticket receipt positions and other operations of the ticket burster, the side car comprising:

a second housing comprising a frame, a top wall, spaced-apart side walls, a rear wall, a base configured to rest on the floor, and a front wall, wherein one of the walls of the second housing is moveable from a closed and locked position to an open position to allow access to an interior of the second housing, a physical connection assembly configured to connect the side car to the first housing of the lottery ticket vending machine, an electrical connection and communication assembly configured to send data to the controller, and at least one of a paper bet slip receiver assembly, a currency receiver assembly, and a coin receiver assembly.

14. The side car of claim 13, wherein the paper bet slip receiver assembly comprises:

a slip receiver, a slip reader, and a slip storage compartment.

15. The side car of claim 14, wherein the slip receiver comprises:

a section defining a slip receiving slot and a bet slip engager.

16. The side car of claim 13, wherein the currency receiver assembly comprises:

a currency receiver, a currency reader, and a currency storage compartment.

17. The side car of claim 16, wherein said currency receiver comprises:

a section defining a currency receiving slot, and a currency engager.

18. The side car of claim 13, wherein the coin reader assembly comprises:

a coin receiver, a coin reader, and a coin storage compartment.

19. The side car of claim 18, wherein said coin receiver comprises:

a section defining a coin receiving slot, and a coin path.

20. The side car of claim 13, wherein the electrical connection and communication assembly is connectable to an electrical connection and communication assembly of the lottery ticket vending machine.

* * * * *